United States Patent
Pastorelli

(10) Patent No.: US 8,966,451 B2
(45) Date of Patent: Feb. 24, 2015

(54) IDENTIFYING POTENTIAL LOCK CONDITIONS IN TRANSACTIONAL SOFTWARE APPLICATIONS

(75) Inventor: Bernardo Pastorelli, L'Aquila (IT)

(73) Assignee: International Business Machines Corporation, Armonk, NY (US)

( * ) Notice: Subject to any disclaimer, the term of this patent is extended or adjusted under 35 U.S.C. 154(b) by 1732 days.

(21) Appl. No.: 12/323,887

(22) Filed: Nov. 26, 2008

(65) Prior Publication Data

US 2009/0144706 A1      Jun. 4, 2009

(30) Foreign Application Priority Data

Nov. 30, 2007   (EP) ...................................... 07121950

(51) Int. Cl.
- *G06F 9/44* (2006.01)
- *G06F 7/00* (2006.01)
- *G06F 11/36* (2006.01)
- *G06F 9/46* (2006.01)
- *G06F 9/52* (2006.01)

(52) U.S. Cl.
CPC ............ *G06F 11/3684* (2013.01); *G06F 9/466* (2013.01); *G06F 9/524* (2013.01)
USPC .......................................... 717/128; 707/704

(58) Field of Classification Search
USPC .......................................... 717/128; 707/704
See application file for complete search history.

(56) References Cited

U.S. PATENT DOCUMENTS

| | | | | |
|---|---|---|---|---|
| 4,791,554 A | * | 12/1988 | Hirota et al. ........................... | 1/1 |
| 5,682,537 A | * | 10/1997 | Davies et al. .................. | 710/200 |
| 6,115,715 A | * | 9/2000 | Traversat et al. ............. | 717/121 |
| 7,386,557 B2 | * | 6/2008 | Barga et al. ............................ | 1/1 |
| 7,594,053 B2 | * | 9/2009 | Dvorkin et al. ............... | 710/200 |
| 7,752,605 B2 | * | 7/2010 | Qadeer et al. ................. | 717/127 |
| 8,176,022 B1 | * | 5/2012 | Garcia .......................... | 707/704 |

OTHER PUBLICATIONS

Agarwal, Rahul; Stoller, Scott D.; Wang, Liqiang; "Detecting Potential Deadlocks with Static Analysis and Run-Time Monitoring" 2006; 17 pages; Computer Science Department, SUNY at Stony Brook; Stony Brook, NY, USA.

Detlefs, David; Nelson, Greg; Saxs, James B.; "Simply: A Theorem Prover for Program Checking" Jul. 16, 2003; 122 pages; Systems Research Center HP Laboratories, HP-2003-148; Palo Alto, CA; USA.

* cited by examiner

*Primary Examiner* — Li B Zhen
*Assistant Examiner* — Hang Pan
(74) *Attorney, Agent, or Firm* — D'Ambrosio & Menon, PLLC; Usha Menon

(57) ABSTRACT

Systems, and products for testing a transactional software application which interacts with a database structure. The software application includes a plurality of application units, which are adapted to be executed at least in part concurrently. Executing the software application includes executing a plurality of transaction operations on the database structure by a plurality of respective invocations of a database management system of the database structure by the respective plurality of application units. The system also includes computer program instructions for determining locks being applied by the database management system on elements of the database structure for each transaction operation executed by each application unit individually. The system also includes computer program instructions for identifying potential lock conditions of the software application in possible successions of application of the locks according to possible interleaving of the application units.

14 Claims, 9 Drawing Sheets

US 8,966,451 B2

IDENTIFYING POTENTIAL LOCK CONDITIONS IN TRANSACTIONAL SOFTWARE APPLICATIONS

PRIORITY

This application is based on and claims the benefit of priority from European Patent Application No. EP07121950, filed Nov. 30, 2007.

BACKGROUND

The test of a software application is a very critical phase of its development. This is especially true for the detection of lock conditions (or simply locks) in a software application of the non-sequential type, wherein multiple application units (such as threads) can be executed concurrently in a non-deterministic order. A classical situation is that of a deadlock, wherein two threads are unable to proceed because each one of them is waiting for something to be done by the other. For example, the deadlock may occur when a first thread is waiting for a variable that has already been locked by a second thread, and at the same time the second thread is waiting for another variable that has already been locked by the first thread. Several tools are available to facilitate the identification of potential deadlocks during the development of the software application. These tools may be based on either a static analysis of the software application (on the basis of its definition) or a dynamic analysis thereof (on the basis of its execution).

Other deadlocks may occur in a software application of the transactional type. In this case, the software application interacts with a database (i.e., a structured collection of data) in coherent, reliable, and atomic interaction units—sometimes referred to as transactions—through a corresponding Database Management System (DBMS). A typical example is that of two transactions, each one formed by a pair of queries that race for an exclusive access to different elements of the database.

The DBMS is generally able to detect the occurrence of the transaction deadlocks at run-time. When this happens, the DBMS cancels one or more of the involved transactions, and rolls back the database to restore its (correct) status preceding the canceled transactions.

SUMMARY

The DBMS is only able to detect transaction deadlocks relating to the corresponding database. Thus, the DBMS is completely unable to detect deadlocks of a mixed type (i.e., caused by a transaction and another operation of the software application). A typical example is that of two threads racing for accessing a variable and a table of a database in mutual exclusion. Therefore, when a mixed deadlock occurs no function is available to recover the correct operation of the software application, which then has to be closed. Any canceled transaction that involves the intervention of a user is perceived as a failure. When a DBMS cancels a transaction, the same transaction must be manually repeated by the user. This is annoying, tedious and time consuming.

Generally, the present disclosure is aimed at facilitating the identification of potential lock conditions due to interactions with database structures. More specifically, one or more embodiments of the invention include a system which comprises computer program instructions for testing a transactional software application which interacts with a database structure, such as, for example, a Java application. The software application includes a plurality of application units (such as threads), which are adapted to be executed at least in part concurrently.

Systems, and products are disclosed for testing a transactional software application which interacts with a database structure. The software application includes a plurality of application units, which are adapted to be executed at least in part concurrently. Executing the software application includes executing a plurality of transaction operations on the database structure by a plurality of respective invocations of a database management system of the database structure by the respective plurality of application units. The system also includes computer program instructions for determining locks being applied by the database management system on elements of the database structure for each transaction operation executed by each application unit individually. The system also includes computer program instructions for identifying potential lock conditions of the software application in possible successions of application of the locks according to possible interleaving of the application units. In an embodiment of the invention, the determination of the applied locks is performed by intercepting the corresponding invocations of the database management system. A stub module may wrap a driver for the database management system. The locks may be determined by querying the database management system accordingly in response to the corresponding intercepted invocations.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
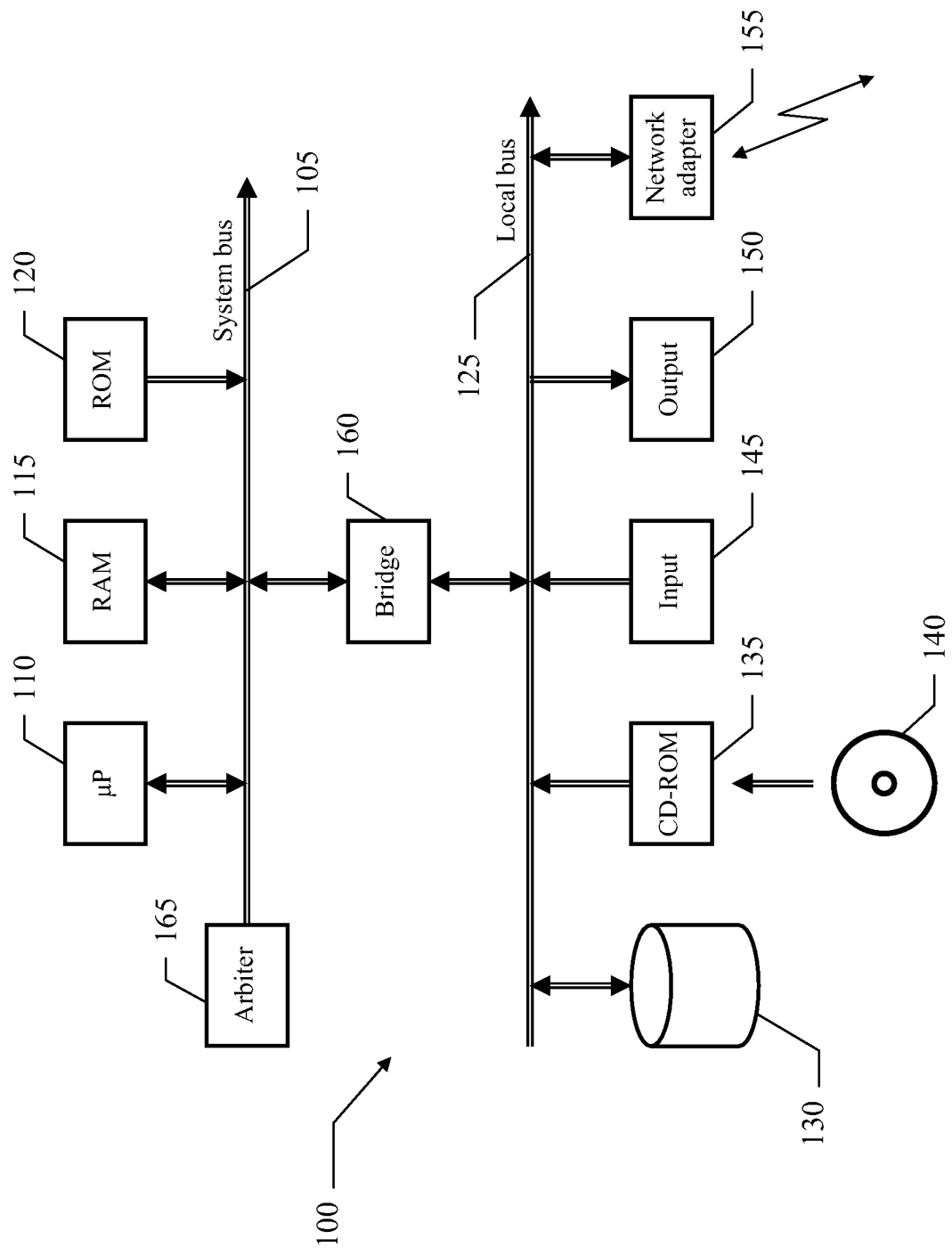
FIG. 1 is a schematic block diagram of a computer that can be used to practice the solution according to an embodiment of the invention.

FIG. 1 shows the functional blocks of an exemplary computer according to one embodiment of the present invention. Considering FIG. 1, the computer 100 is formed by several units that are connected in parallel to a system bus 105. In detail, one or more microprocessors (mP) 110 control operation of the computer 100; a RAM 115 is directly used as a working memory by the microprocessors 110, and a ROM 120 stores basic code for a bootstrap of the computer 100. Several peripheral units are clustered around a local bus 125 (by means of respective interfaces). Particularly, a mass memory consists of one or more hard-disks 130 and drives 135 for reading CD-ROMs 140. Moreover, the computer 100 includes input units 145 (for example, a keyboard and a mouse), and output units 150 (for example, a monitor and a printer). An adapter 155 is used to connect the computer 100 to a network (not shown in the figure). A bridge unit 160 interfaces the system bus 105 with the local bus 125. Each microprocessor 110 and the bridge unit 160 can operate as master agents requesting an access to the system bus 105 for transmitting information. An arbiter 165 manages the granting of the access with mutual exclusion to the system bus 105.

The computer 100 is used to test a software application during its development. The software application is of the transactional type (i.e., it executes transactions on a database by invoking the database's DBMS) and includes multiple threads (which may run concurrently in a non-deterministic order). The test process identifies any potential (transaction) deadlock of the software application being due to the execution of the transactions.

According to some embodiments of the present invention, each lock that is applied by the DBMS on elements of the database (such as its tables, columns, records, and the like) is determined for each basic operation of the transactions (hereinafter 'transaction operation'), which is executed by each thread of the software application. The system identifies each potential deadlock of the software application, which may occur in each possible succession of the application of the locks according to any possible interleaving of the threads.

The system identifies the transaction operations that the different threads of the software application may execute. The system may determine the locks that are applied for each transaction operation; alternatively, this information may be provided at run-time by the DBMS (since it depends on the actual status of the database).

The system facilitates the identification of potential deadlocks (during the development of the software application) even when they are caused by the execution of transactions on a database. Aspects of the invention may be implemented in a complex software application, wherein a myriad of threads may potentially access the same database at different times. As a result, the occurrence of the (transaction) deadlocks is strongly reduced during the execution of the software application.

Figure 2:
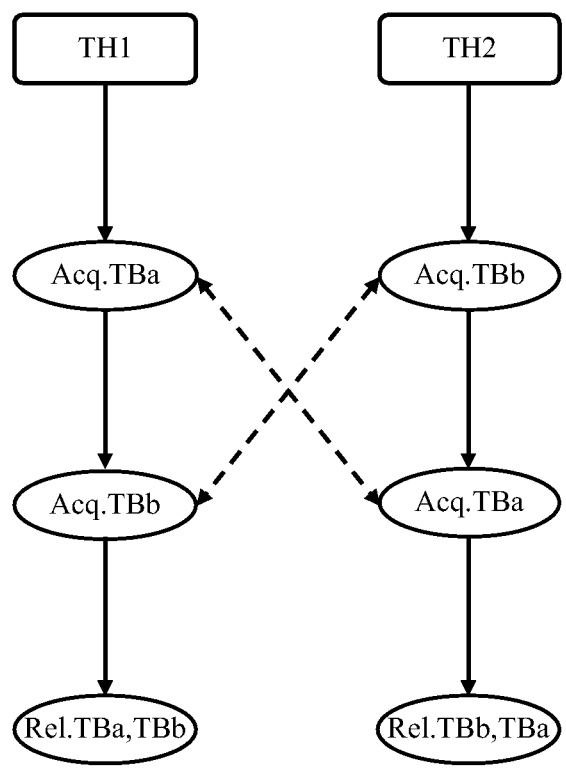
FIGS. 2-4 show an example of application of the solution according to an embodiment of the invention.
Figure 3:
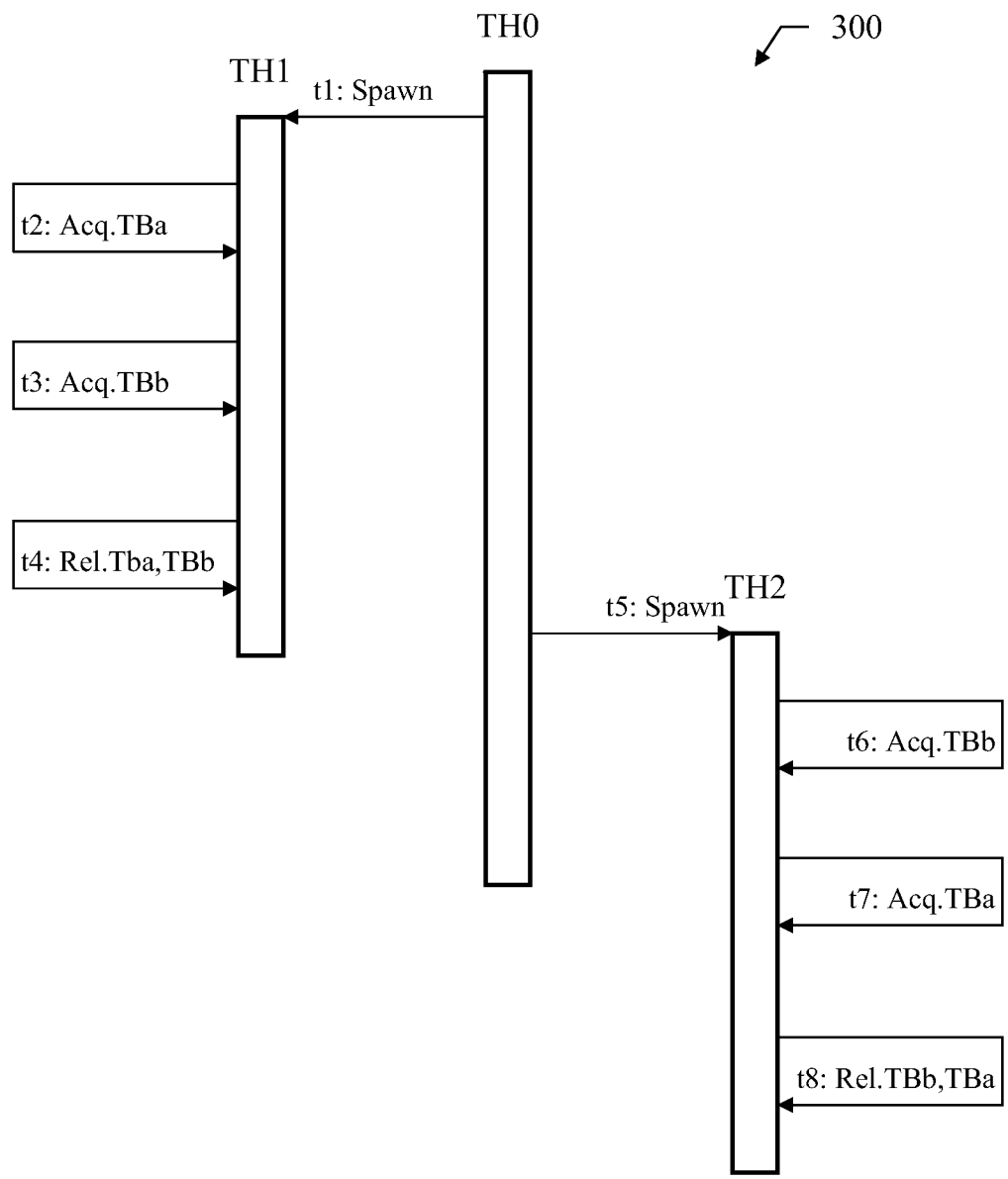
Figure 4:
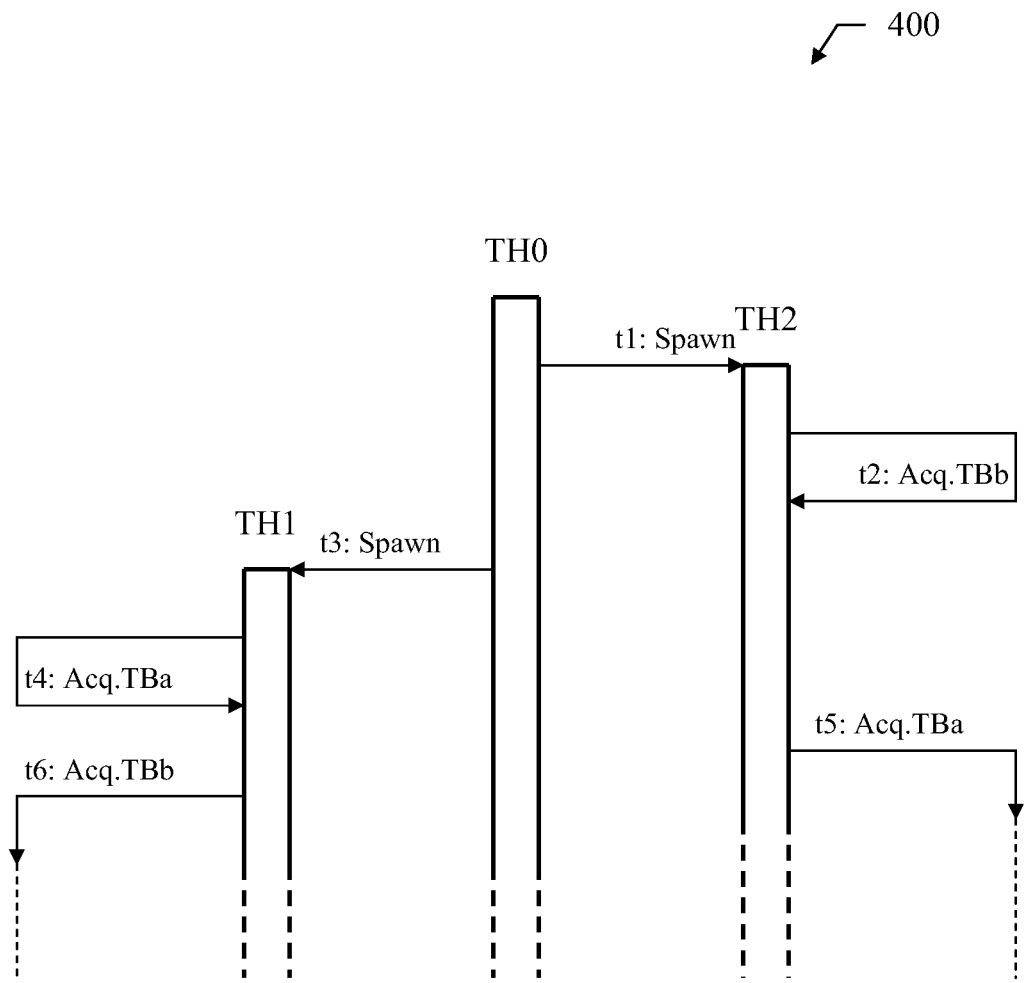

An exemplary application according to an embodiment of the invention is shown in FIGS. 2-4. With reference in particular to FIG. 2, the execution of the software application under test involves the running of a (main) thread TH0. The thread TH0 spawns two other threads TH1 and TH2 (which may run concurrently in a non-deterministic order). The thread TH1 executes a transaction, which consists of a query QR1*a* (for reading selected information from the database), followed by another query QR1*b* (for updating the database accordingly), and then the commit of the result (CMT1). The thread TH2 executes another transaction, which consists of a query QR2*b* (for reading other selected information from the database), followed by another query QR2*a* (for updating the database accordingly), and then the commit of the result (CMT2). The DBMS determines that the query QR1*a* acquires a lock on (or simply acquires) a table TBa in exclusive mode, the query QR1*b* acquires a table TBb in exclusive mode, and the commit CMT1 releases both the tables TBa, TBb. Similarly, the DBMS determines that the query QR2*b* acquires the table TBb in exclusive mode, the query QR2*a* acquires the table TBa in exclusive mode, and the commit CMT2 releases both the tables TBb, TBa.

The above-mentioned transaction operations are represented with a corresponding lock tree 200 in the figure. Particularly, a rounded box represents each (relevant) thread that applies (i.e., acquire and/or release) one or more locks to elements of the database (TH1 and TH2 in the example at issue). A circle instead represents each applied lock; an arrow reaches each lock of a generic thread from the most recent lock already acquired by the same thread (with the arrow that comes directly from the thread in case of the first acquired lock). Therefore, in the example at issue, a sequence of arrows moves from the thread TH1 to the acquisition of the table TBa, to the acquisition of the table TBb, and to the release of the tables TBa, TBb. Another sequence of arrows moves from the thread TH2 to the acquisition of the table TBb, to the acquisition of the table TBa, and to the release of the tables TBb, TBa. Each pair of potentially conflicting locks is identified in the lock tree 200 by a bi-directional dashed arrow between them. Conflicting locks are the ones being applied in mutual exclusion to overlapping elements of the database by different threads, so that they may lead to the occurrence of a deadlock according to their succession of execution (such as the acquisitions of the table TBa and the acquisitions of the table TBb by the threads TH1, TH2 in the example at issue).

During the test process of the software application no deadlock might occur. Indeed, as shown in FIG. 3 by a corresponding sequence diagram 300, let us assume that the thread TH0 spawns the thread TH1 at the time t1. The thread TH1 then executes the query QR1*a* (acquiring the table TBa) at the time t2, and the query QR1*b* (acquiring the table TBb) at the time t3 without any problem because both of the tables TBa and TBb are available. The thread TH1 then executes the commit CMT1 (releasing the tables TBa, TBb) at the time t4. Later on, the thread TH0 spawns the thread TH2 at the time t5. The thread TH2 then executes the query QR2*b* (acquiring the table TBb) at the time t6, and the query QR2*a* (acquiring the table TBa) at the time t7 again without any problem (since both the tables TBb and TBa have already been released by the thread TH1). The thread TH2 then executes the commit CMT2 (releasing the tables TBb, TBa) at the time t8.

Nevertheless, the analysis of the above-described lock tree makes it possible to identify a potential deadlock of the software application. For example, a deadlock may occur when the different transaction operations of the threads TH1 and TH2 are executed in the succession illustrated in FIG. 4 by a corresponding sequence diagram 400. In this case, the thread TH0 spawns the thread TH2 at the time t1. The thread TH2 then executes the query QR2*b* (acquiring the table TBb) at the time t2. Later, the thread TH0 spawns the thread TH1 at the time t3. The thread TH1 then executes the query QR1*a* (acquiring the table TBa) at the time t4. In this situation, the thread TH2 enters a waiting condition at the time t5 when it tries to execute the query QR2*a* (since the table TBa is already acquired by the thread TH1). Likewise, the thread TH1 enters a waiting condition at the time t6 when it tries to execute the query QR1*b* (since the table TBb is already acquired by the thread TH2). Therefore, none of the threads TH2 and TH1 can proceed, and the whole software application is blocked (with the corresponding deadlock that is recovered by the DBMS canceling one of the transactions QR1*a*, QR1*b*, CMT1 or QR2*b*, QR2*a*, CMT2 and rolling back the database accordingly).

Therefore, the identification of this potential deadlock during the test process of the software application permits corrective actions by the development team. For example, it is possible to add a test conditioning the execution of the query QR1*a* in the thread TH1 and another test conditioning the execution of the query QR2*b* in the thread TH2 to the availability of both the tables TBa, TBb. In this way, the occurrence of the deadlock is prevented during the execution of the software application in every condition.

In some embodiments, the proposed solution may be integrated with known techniques for identifying potential deadlocks being due to different operations of the software application that do not involve any interaction with the database (hereinafter 'application operations'). These application operations may include those facilitating access to other elements of the software application (not included in the database), such as variables, files, windows, and the like. The system may determine each lock being applied by the software application on its elements for each thread (in response to corresponding application operations) as well. The identification of the potential deadlocks of the software application may be based on the locks that are applied by both the transaction operations and the application operations.

Aspects of the invention implementing this functionality are capable of identifying transaction deadlocks and application deadlocks. These aspects may also identify mixed deadlocks, which may be due to a combination of transaction operations and application operations. At the same time, the proposed feature allows preventing any false identification of transaction deadlocks that are prevented by the application operations.

Figure 5:
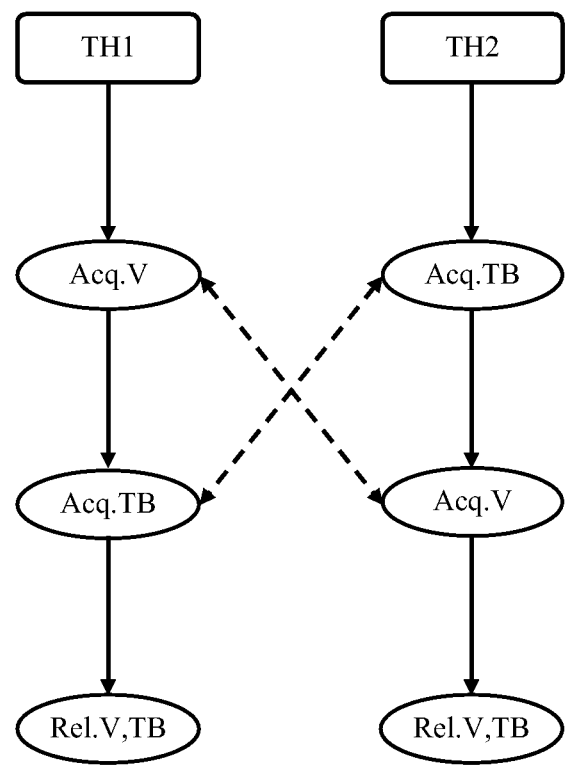
FIGS. 5-8 show examples of application of the solution according to another embodiment of the invention.
Figure 6:
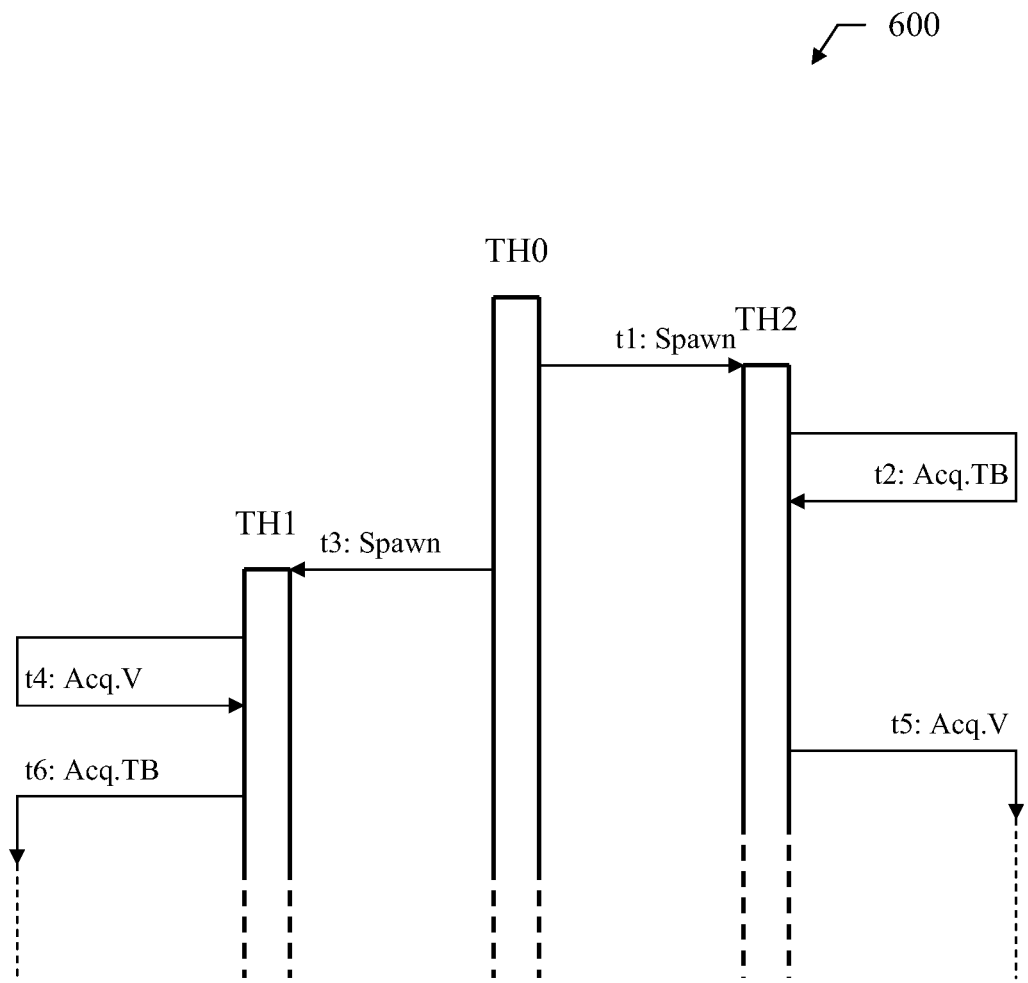

Different examples of application of the solution according to this embodiment of the invention are shown in FIGS. 5-8. With reference in particular to FIG. 5, a lock tree 500 of the software application under test shows that a thread TH1 reads a value from a variable V thereby requiring its exclusive access, followed by the thread executing a query QR1 on the database (for updating it accordingly), with the commit of the result involving the release of the variable V (CMT1). A thread TH2 executes a query QR2 on the database (for reading selected information from it), followed by writing the variable V (accordingly requiring its exclusive access) and the commit of the result involving the release of the variable V (CMT2). The DBMS determines that both the queries QR1 and QR2 acquire a table TB in exclusive mode, and that both the commits CMT1 and CMT2 release the same table TB. Therefore, the system identifies the acquisitions of the variable V and the acquisitions of the table TB by the threads TH1,TH2 as pairs of potentially conflicting locks.

The analysis of the above-described lock tree makes it possible to identify a potential (mixed) deadlock of the software application. For example, this may occur when the different operations, such as transaction and application operations, of the threads TH1 and TH2 are executed in the succession illustrated in FIG. 6 by a corresponding sequence diagram 600. Indeed, in this case a thread TH0 spawns the thread TH2 at the time t1. The thread TH2 then executes the query QR2 (acquiring the table TB) at the time t2. Later, the thread TH0 spawns the thread TH1 at the time t3. The thread TH1 then reads the variable V (acquiring it) at the time t4. In this situation, the thread TH2 enters a waiting condition at the time t5 when it tries to write the variable V (since it is already acquired by the thread TH1). Likewise, the thread TH1 enters a waiting condition at the time t6 when it tries to execute the query QR1 (since the table TB is already acquired by the thread TH2). Therefore, none of the threads TH2 and TH1 can proceed, and the whole software application is blocked (with no function available to recover the mixed deadlock).

Figure 7:
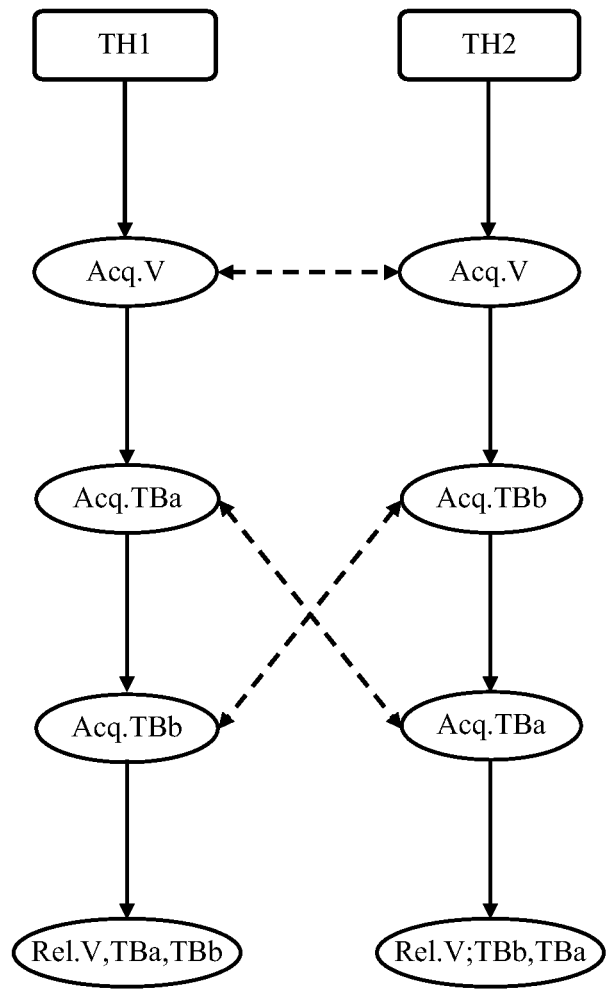
Figure 8:
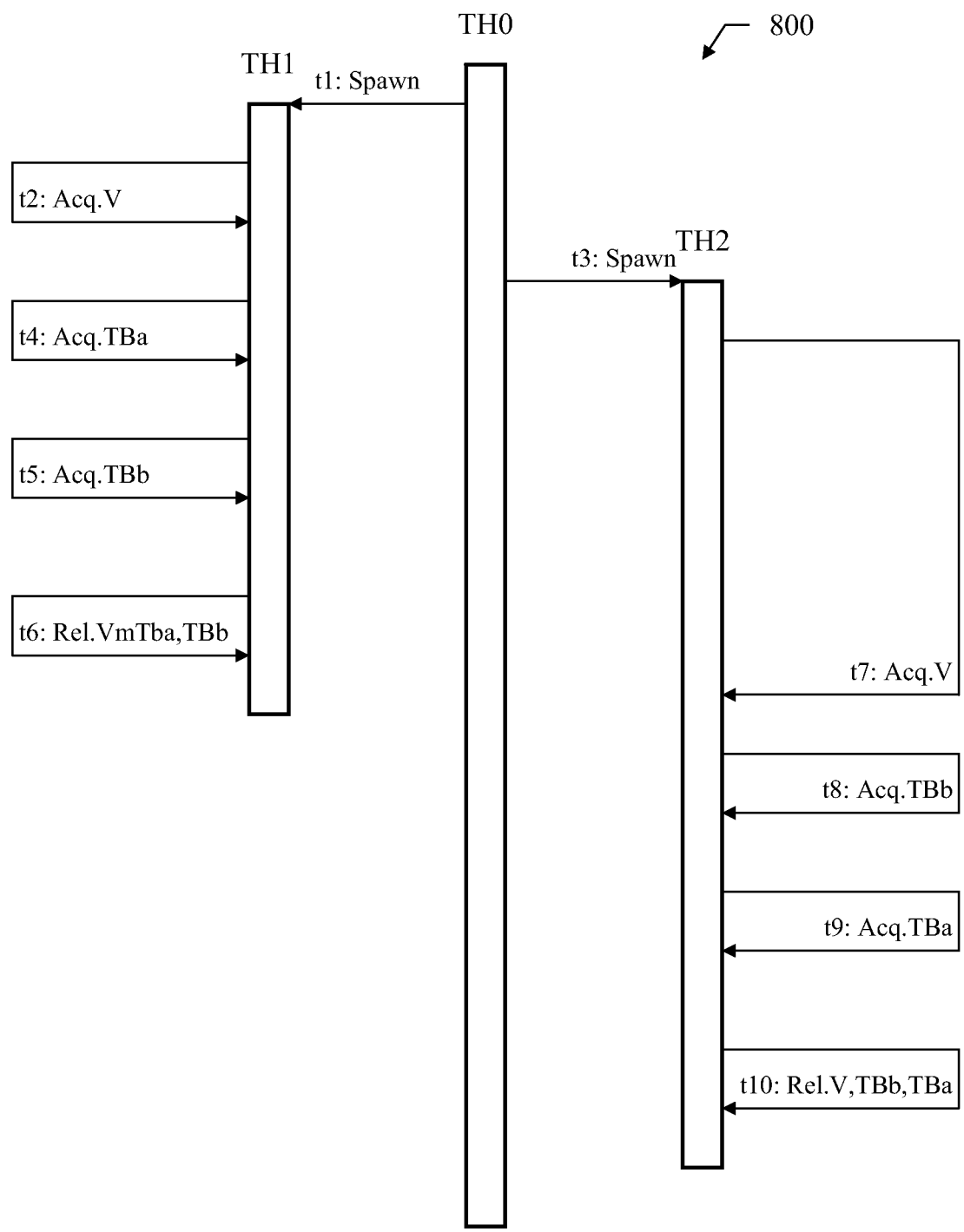

With reference to FIG. 7, a lock tree 700 of the software application under test shows that a thread TH1 writes a variable V thereby requiring its exclusive access, and later executes a transaction consisting of a query QR1a (for reading selected information from the database), followed by another query QR1b (for updating the database accordingly), and then the commit of the result involving the release of the variable V (CMT1). On the other hand, the thread TH2 writes the same variable V thereby requiring its exclusive access, and later executes a transaction consisting of a query QR2b (for reading selected information from the database), followed by another query QR2a (for updating the database accordingly), and then the commit of the result involving the release of the variable V (CMT1). The DBMS determines that both the queries QR1a and QR2a acquire a table TBa in exclusive mode, both the queries QR1b and QR2b acquire a table TBb in exclusive mode, and both the commits CMT1 and CMT2 release the tables TBa and TBb. The acquisitions of the variable V, the acquisitions of the table TBa, and the acquisitions of the table TBb by the threads TH1,TH2 are identified as pairs of potentially conflicting locks.

However, the analysis of the above-described lock tree now excludes any potential (transaction) deadlock of the software application. Indeed, the acquisition of the variable V serializes the execution of the transactions by the threads TH1 and TH2 so as to avoid any potential conflict. For example, let us consider the execution of the different operations of the threads TH1 and TH2 in the succession illustrated in FIG. 8 by a corresponding sequence diagram 800. In this case, a thread TH0 spawns the thread TH1 at the time t1. The thread TH1 then writes the variable V (acquiring it) at the time t2. The thread TH0 spawns the thread TH2 at the time t3. Returning to the thread TH1, it executes the query QR1a (acquiring the table TBa) at the time t4 and the query QR1b (acquiring the table TBb) at the time t5 without any problem since both the tables TBa and TBb are available. The thread TH1 then executes the commit CMT1 (releasing the variable V and the tables TBa,TBb) at the time t6. Meanwhile, the thread TH2 enters a waiting condition when it tries to write the variable V before the time t6 (since it is already acquired by the thread TH1). When the thread TH1 releases the variable V (time t6), the thread TH2 can now write the variable V (acquiring it) at the time t7. The thread TH2 executes the query QR2b (acquiring the table TBb) at the time t8 and the query QR2a (acquiring the table TBa) at the time t9 without any problem, since both the tables TBb and TBa have already been released by the thread TH1. The thread TH2 executes the commit CMT2 (releasing the variable V and the tables TBb,TBa) at the time t10.

Figure 9:
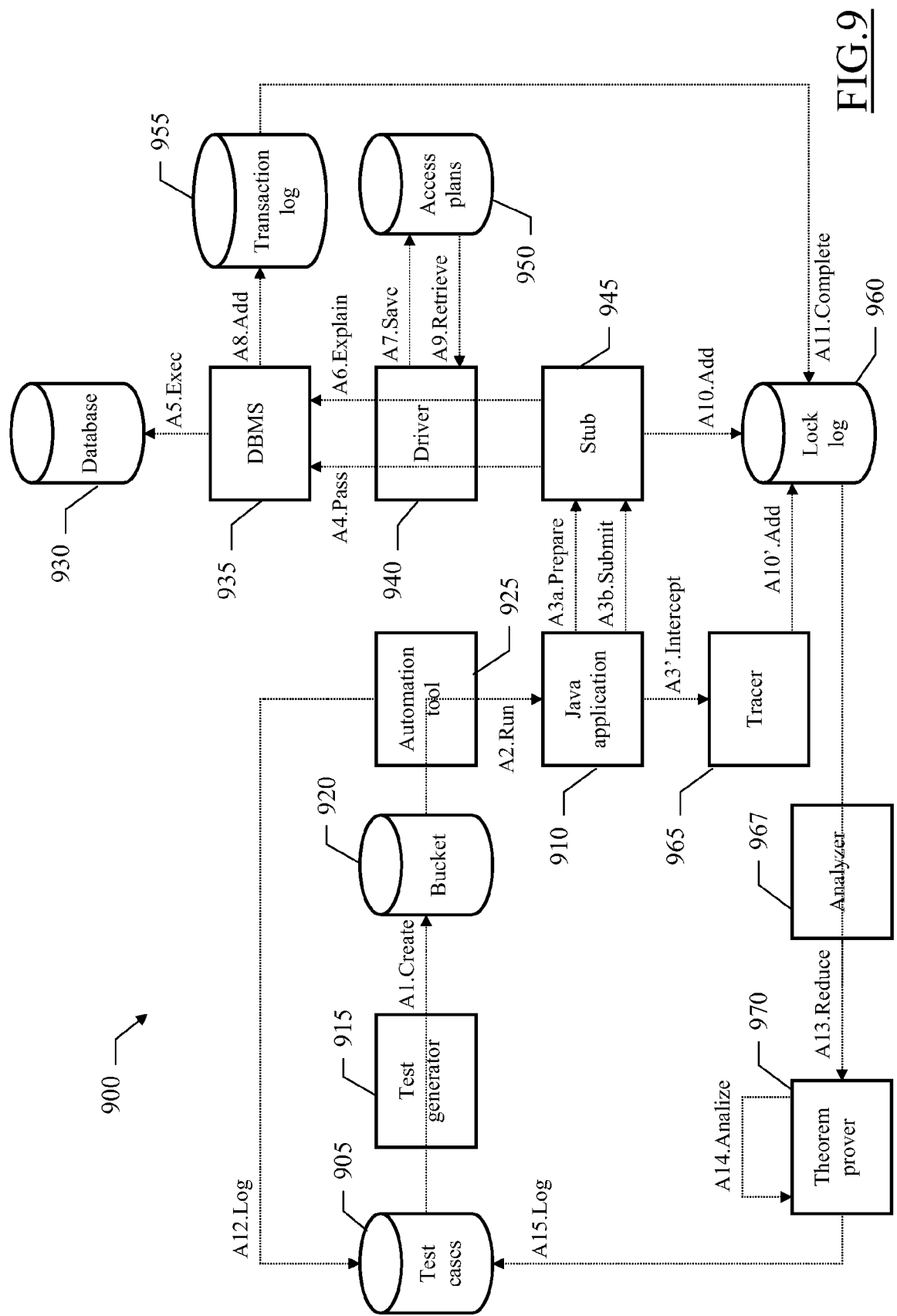
FIG. 9 is a collaboration diagram representing the roles of different software components that may be used to implement the solution according to an embodiment of the invention.

FIG. 9 is a collaboration diagram representing data flow and the roles of different software components for testing a transactional software application interacting with a database structure according to an embodiment of the invention. Referring to FIG. 9, the main software components that can be used to implement an embodiment of the invention are denoted as a whole with the reference 900. The information (programs and data) is typically stored on the hard-disk and loaded (at least partially) into the working memory of the computer when the programs are running. The programs are initially installed onto the hard disk, for example, from CD-ROM. Particularly, the figure describes the static structure of the system via the corresponding components and its dynamic behavior via a series of exchanged messages, each one representing a corresponding action, denoted with sequence numbers preceded by the symbol "A".

More in detail, a repository 905 stores a set of test cases for verifying the correctness of a specific software application 910. For example, the software application 910 is written in the Java language for its execution on a Java Virtual Machine, or JVM (not shown in the figure). A test generator 915 creates an execution bucket for each run of the test process on the Java application 910. The bucket specifies the operations to be performed for running selected test cases extracted from their repository 905 in a machine-readable language such as, for example, an XML-based language. The method saves the bucket into a corresponding file 920 (actions "A1.Create"). An automation tool 925 (for example, consisting of the STAF/STAX—formed by the STAX execution engine running on top of the STAF framework) controls the running of each bucket read from the file 920 on the Java application 910 (action "A2.Run").

The corresponding execution of the Java application 910 includes performing transactions on a relational database 930, which is controlled by a DBMS 935, such as, for example, DB2 of IBM Corporation. More specifically, the execution of each transaction operation by the Java application 910 requires a corresponding invocation of the DBMS 935 for accessing the database 930. For this purpose, the Java application 910 exploits the Java DataBase Connectivity (JDBC), which consists of an abstraction layer between the Java application 910 and the DBMS 935. More specifically, the JDBC provides a series of interfaces (in the package java.sql), which expose a set of APIs for accessing every DBMS (independently of its type). A vendor of each specific DBMS 935 supplies a driver 940 that implements the methods of these interfaces on the specific DBMS 935. In some aspects of the disclosure, in order to exploit the functionality of the JDBC on the DBMS 935, the Java application 910 loads the class of the corresponding driver 940 explicitly. The execution of each transaction operation by the Java application 910 then involves the submission of a corresponding command to the driver 940 calling the methods exposed by the interfaces of the JDBC (implemented by the driver 940).

According to an embodiment of the invention, the Java application 910 loads the class of a stub module (or simply stub) 945 instead of the driver 940. The stub 945 wraps the driver 940 by implementing the same interfaces of the JDBC. The stub 945 in turn loads the class of the driver 940, and passes it any command that is received from the Java application 910 so that its presence is completely opaque. The replacing of the driver 940 with the stub 945 requires changing the Java application 910 accordingly. Particularly, when the Java application 910 is provided as a stand-alone application, it may be necessary to update its code for replacing the name of the driver 940 with the one of the stub 945 in the instruction loading the corresponding class. Conversely, when the Java application 910 is provided as a component running inside a J2EE container offering common services for all its components (such as the "WebSphere" by IBM Corporation), the name of the driver 940 may be a configuration parameter maintained by the container so that updating this configuration parameter (without any change to the code of the Java application 910) is sufficient.

For each static query to be executed one or more times on the database 930, the Java application 910 submits a corresponding prepare command in advance to the stub 945 for generating its executable code (action "A3a.Prepare"). The stub 945 passes the prepare command to the driver 940, which implements its execution on the DBMS 935 (action "A4.Pass"). In response thereto, the prepare command is executed by the DBMS 935 on the database 930 (action "A5.Exec"). In this phase, the DBMS 935 parses the query to validate its syntax and semantic. The DBMS 935 then generates an access plan (specifying an order of steps for executing the query) used to generate the executable code. The access plan may be determined (such as, for example, by an optimizer of the DBMS 935) as the one that minimizes an estimated execution time of the query. Minimizing the estimated execution time may be carried out according to a number of factors, such as table indexes, statistics, and correlations. The access plan so determined is stored into (virtual) explain tables of the database 930.

The stub 945 then submits an explain command for the same query to the DBMS 935 (through the driver 940), in order to retrieve its access plan from the explain tables (action "A6.Explain"). The returned information includes a list of the tables that will be accessed during each execution of the prepared query, with the corresponding type of locks (such as shared read, exclusive read, write, and the like) that will be applied on these tables. The stub 945 saves the access plan of the query (or at least its relevant information) into a corresponding file 950 (action "A7.Save").

For the execution of a static query, the Java application 910 submits a corresponding command to the stub 945 (action "A3b.Submit"). As above, the stub 945 passes the command to the driver 940, which implements its execution on the DBMS 935 (same action "A4.Pass"). In response thereto, the query is executed by the DBMS 935 on the database 930 according to its access plan that is already available (same action "A5.Exec"). Any operation executed by the query on the database 935 is added to a transaction log 955 (action "A8.Add"). At the same time, the stub 945 retrieves the access plan of the query from the file 950 (action "A9.Retrieve"). The stub 945 then adds an indication of the query and of the thread requiring its execution (as specified in the submission of the corresponding command), and of the applied locks (as specified in the corresponding access plan) to a lock log 960 (action "A10.Add"). In this way, the execution time of the query is substantially unaffected (since the required access plan has been collected in advance during its preparation).

Similar operations are performed at every execution of a non-prepared static query, of a dynamic query, or of any other transaction operation. In this case, the Java application 910 submits a corresponding command to the stub 945 (same action "A3b.Submit"), which passes it to the driver 940 implementing its execution on the DBMS 935 (same action "A4.Pass"). In response thereto, the DBMS 935 parses the command to validate its syntax and semantic, and generates the access plan for its executable code; the command is then executed by the DBMS 935 on the database 930 according to its access plan (same action "A5.Exec"), with any operation executed by the command on the database 930 that is added to the transaction log 955 (same action "A8.Add"). At the same time, the stub 945 submits an explain command for the transaction operation to the DBMS 935 in order to retrieve its access plan (same action "A6.Explain"). As above, the stub 945 then adds an indication of the transaction operation, of the thread requiring its execution, and of the applied locks to the lock log 960 (same action "A10.Add").

Alternatively, in response to each submitted command, the stub 945 only adds an indication of the command and of the thread that submitted it to the lock log 960 (same action "A10.Add"). Once the test process has been completed, the locks that have been applied on the database 930 for each command are retrieved from the transaction log 955. In this way, it is possible to complete each entry of the lock log 960 with the locks that have been applied during the execution of the corresponding command (action "A11.Complete").

Concurrently, the Java application 910 also executes application operations (which do not involve any interaction with the database 930). Each application operation applying one or more locks on elements of the Java application 910 is intercepted by a tracer 965 (action "A3'.Intercept"). For example, the tracer 965 may be included in a suitable instrumented JVM. As above, the tracer 965 adds an indication of the thread executing the application operation and of its locks to the lock log 960 (action "A10'.Add"). In this way, the lock log 960 will provide a list of all the locks that are applied (in response to either transactional or application operations) by the different threads of the Java application 910 during its execution.

At the end of each test case, the automation tool 925 logs a result of the test case (i.e., whether it passed or failed according to a comparison between its actual outcome and expected outcome) into the test case repository 905 (action "A12.Log").

Alternatively, an analyzer 967 accesses the lock log 960 at the end of the test process. The analyzer 967 simplifies the sequence of the applied locks (extracted from the lock log 960) to remove those sequences that are not potentially conflicting (action "A13.Reduce"). The potentially conflicting locks are those that are applied in mutual exclusion by two or more different threads on corresponding elements (either of the database 930 or of the Java application 910) and that are incompatible (for example, both of them of the write type requesting an exclusive access to the elements of interest). Two elements are considered corresponding when they are at least in part potentially overlapping. When the elements are defined statically, these elements are overlapping if they are the same or they have at least a common portion (for example, a whole table and any selected records thereof are overlapping). On the other hand, when the elements are defined dynamically, these elements are overlapping if it is not possible to ensure that they do not have any common portion in any situation. For example, records selected from a table by applying a condition "<100" to a field thereof, and records selected from the same table by applying a condition ">1,000" to the same field are not overlapping (since they can never have any record in common). In contrast, records selected from a table by applying a condition "=MyValue1" to a first field thereof, and records selected from the same table by applying a condition "=MyValue2" to a second field thereof are overlapping since it is possible to have one or more records with the first field equal to "MyValue1" and at the same time the second field equal to "MyValue2".

The analyzer 967 then constructs a formal expression, which is true when the remaining potentially conflicting locks cannot generate a deadlock in any possible succession of their application. For example, the expression is defined with variables representing any possible order of application of the locks in the different threads, which variables are constrained to represent the predefined order of application of the locks within each thread.

The analyzer 967 passes the expression so obtained to a theorem prover 970. The theorem prover 970 is a software module that is capable of determining whether formal expressions are true of false. For this purpose, the theorem prover 970 tries to find an assignment of the variables of the received expression making it false—i.e., which generates a succession of applied locks generating a deadlock (action "A14.Analyze"). When this happens, the theorem prover 970 provides the corresponding variable assignment, which defines a wrong execution path of the (transaction and/or application) operations of the threads leading to the deadlock (together with their time interleaving). As above, the theorem prover 970 logs each wrong execution path into the test case repository 905 (action "A15.Log").

In order to satisfy local and specific requirements, a person skilled in the art may apply to the solution described above many modifications and alterations. Particularly, although particular embodiments in the present disclosure have been described with a certain degree of particularity, it should be understood that various omissions, substitutions and changes in the form and details as well as other embodiments are possible. Moreover, it is expressly intended that specific elements and/or method components described in connection with any disclosed embodiment of the invention may be incorporated in any other embodiment.

Particularly, the proposed solution lends itself to be implemented with an equivalent method by using similar steps, removing some steps being non-essential, adding further optional steps, and so on. The steps may be performed in a different order, concurrently or in an interleaved way.

Similar considerations apply if the same method is applied during whatever test process (even with the manual execution of the test cases). The devised technique may also be applied to an any other software application of the transactional type (even written in a different language, such as C++, VisualBasic, and the like). The software application may interact with any equivalent database structure, which is controlled by whatever database management system (even not of the relational type). Moreover, the software application may include any other application units that can be executed at least on part concurrently (such as processes, distributed modules, and the like). The transaction operations described above are merely illustrative and they must not be interpreted in a limitative manner (for example, other transaction operations are determined by the handling of a cursor used to enumerate the result of a query with the acquisition of the currently selected record). Similar considerations apply to the locked elements of the database (which may also be joined records, multiple tables, and the like) and the types of applied locks (such as single write/multiple reads). Although the preceding description refers to the deadlocks, similar remarks apply to the live-locks or starvation (wherein one or more threads are blocked but not the whole software application), or more generally to any other lock condition. Moreover, the deadlocks may be identified by logging other information and/or by applying other mechanisms. Nothing prevents determining the transaction operations that are executed by the different threads in a different way than disclosed herein (even by analyzing the software application statically).

The loading of the stub instead of the driver may be achieved by wrapping a class loader of the JVM (without any change to the Java application). Alternatively, it is possible to determine the locks that are applied by the DBMS for each transaction operation with a suitable enabled driver, or more generally with any other method (even nonspecific for the Java language) that intercepts each invocation of the DBMS by the software application (for example, by exploiting hooking techniques).

As pointed out above, the locks being applied for each transaction operation may be determined by querying the explain tables either when the queries are prepared or at run-time when they are executed, or more generally by submitting any equivalent command to the DBMS. Aspects of the invention may be based on the explain commands, based on the transaction log, or a combination thereof. Determining the potentially conflicting locks (even taking into account only the locks that are always conflicting) may be carried out in many ways as will occur to those of ordinary skill in the art.

As above, the application operations and the corresponding locked elements described above are not exhaustive (for examples, other locked elements may be peripheral units, network devices, and the like—which are acquired and released to print data, transmit data, and the like). Thus, in some embodiments, the invention may be implemented in only the transaction operations (without taking into account the application operations).

Similar considerations apply if the program (which may be used to implement each embodiment of the invention) is structured in a different way, or if additional modules or functions are provided. Likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented with a hardware structure (for example, integrated in a chip of semiconductor material), or with a combination of software and hardware. It would be readily apparent that it is also possible to deploy the same solution as a service that is accessed through a network (such as in the Internet).

The proposed method may be carried out on a system having a different architecture or including equivalent units (for example, based on a local network). Moreover, each computer may include similar elements (such as cache memories); in any case, it is possible to replace the computer with any code execution entity (such as a PDA, a mobile phone, and the like), or with a combination thereof (such as a multi-tier server architecture, a grid computing infrastructure, and the like).

It should be understood that the inventive concepts disclosed herein are capable of many modifications. To the extent such modifications fall within the scope of the appended claims and their equivalents, they are intended to be covered by this patent.

What is claimed is:

1. A computer program product disposed on a non-transitory computer-usable medium for testing a transactional software application interacting with a database structure, the software application including a plurality of application units adapted to be executed at least in part concurrently, the computer program product comprising:
   computer program instructions for executing the software application, wherein executing the software application comprises executing a plurality of transaction operations on the database structure by a plurality of respective invocations of a database management system of the database structure by the respective plurality of application units;
   computer program instructions for determining locks being applied by the database management system on elements of the database structure for each transaction operation executed by each application unit individually; and
   computer program instructions for identifying potential deadlock conditions of the software application in possible successions of application of the locks according to possible interleaving of the application units, identifying the potential deadlock conditions facilitated by analyzing a lock tree of the software application, the analyzing the lock tree comprising:
      computer program instructions for constructing one or more formal expressions;
      computer program instructions for determining whether the formal expressions are true or false; and
      computer program instructions for finding an assignment of one or more variables of the one or more formal expressions to determine the successions of application of the locks causing the deadlock conditions; and
   computer program instructions for utilizing a theorem prover, the theorem prover is configured to provide a variable assignment that defines a wrong execution path of the operations leading to the deadlock conditions.

2. The computer program product of claim 1 wherein computer program instructions for determining the locks being applied by the database management system for each transaction operation executed by each application unit comprise computer program instructions for intercepting each corresponding invocation of the database management system by each application unit.

3. The computer program product of claim 2 wherein computer program instructions for intercepting each corresponding invocation of the database management system by the application unit comprise:
   computer program instructions for submitting a corresponding command for a driver interfacing the software application with the database management system to a stub module; and
   computer program instructions for passing the command from the stub module to the driver.

4. The computer program product of claim 2 wherein computer program instructions for determining the locks being applied by the database management system for each transaction operation executed by each application unit further comprise:
   computer program instructions for querying, in response to intercepting each corresponding invocation of the database management system by each application unit, the database management system to retrieve the locks being applied by the database management system for each transaction operation; and
   computer program instructions for saving a log item comprising an indication of the application unit and of the locks being applied by the database management system for each transaction operation.

5. The computer program product of claim 2 wherein:
   computer program instructions for executing a plurality of transaction operations on the database structure by a plurality of respective invocations of a database management system of the database structure by the respective plurality of application units comprise:
      computer program instructions for preparing the execution of a set of transaction operations based on a common definition; and
      computer program instructions for executing each transaction operation of the set of transaction operations according to the corresponding preparation;
   computer program instructions for determining the locks being applied by the database management system for each transaction operation executed by each application unit further comprise:
      computer program instructions for, in response to intercepting each corresponding invocation of the database management system by each application unit, querying the database management system to retrieve the locks being applied by the database management system for each transaction operation and logging an indication of the locks for the set of transaction operations; and
      computer program instructions for, in response to the interception of an invocation of the database management system for the execution of the transaction operation, retrieving the locks being logged for the set and saving a log item including an indication of the application unit and of the locks for the set.

6. The computer program product of claim 2 wherein:
   computer program instructions for executing a plurality of transaction operations on the database structure by a plurality of respective invocations of a database management system of the database structure by the respective plurality of application units further comprise computer program instructions for logging an indication of the locks applied for in each transaction operation on the elements of the database structure by the database management system; and computer program instructions for determining locks being applied by the database management system on elements of the database structure for each transaction operation executed by each application unit individually further comprise:

computer program instructions for saving a log item including an indication of the application unit and of the transaction operation in response to the interception of an invocation of the database management system for the execution of the transaction operation; and computer program instructions for completing the log item with the locks being logged for the transaction operation.

7. The computer program product of claim 1 wherein the deadlock conditions are mixed type deadlocks, the mixed type deadlocks caused by a combination of one or more transaction operations and one or more application operations.

8. A system for testing a transactional software application interacting with a database structure, the software application including a plurality of application units adapted to be executed at least in part concurrently, the system comprising:

a processor; and
a computer memory operatively coupled to the processor;
wherein the computer memory has disposed within it:

computer program instructions for executing the software application, wherein executing the software application comprises executing a plurality of transaction operations on the database structure by a plurality of respective invocations of a database management system of the database structure by the respective plurality of application units;

computer program instructions for determining locks being applied by the database management system on elements of the database structure for each transaction operation executed by each application unit individually;

computer program instructions for determining locks being applied by the database management system on elements of the database structure for each transaction operation executed by each application unit individually; and computer program instructions for identifying potential deadlock conditions of the software application in possible successions of application of the locks according to possible interleaving of the application units, identifying the potential deadlock conditions facilitated by analyzing a lock tree of the software application, the analyzing the lock tree comprising:

computer program instructions for constructing one or more formal expressions;
computer program instructions for determining whether the formal expressions are true or false; and
computer program instructions for finding an assignment of one or more variables of the one or more formal expressions to determine the successions of application of the locks causing the deadlock conditions; and computer program instructions for utilizing a theorem prover, the theorem prover is configured to provide a variable assignment that defines a wrong execution path of the operations leading to the deadlock conditions.

9. The system of claim 8 wherein computer program instructions for determining the locks being applied by the database management system for each transaction operation executed by each application unit comprise computer program instructions for intercepting each corresponding invocation of the database management system by each application unit.

10. The system of claim 9 wherein computer program instructions for intercepting each corresponding invocation of the database management system by the application unit comprise:

computer program instructions for submitting a corresponding command for a driver interfacing the software application with the database management system to a stub module; and computer program instructions for passing the command from the stub module to the driver.

11. The system of claim 9 wherein computer program instructions for determining the locks being applied by the database management system for each transaction operation executed by each application unit further comprise computer program instructions for, in response to intercepting each corresponding invocation of the database management system by each application unit:

querying the database management system to retrieve the locks being applied by the database management system for each transaction operation; and saving a log item comprising an indication of the application unit and of the locks being applied by the database management system for each transaction operation.

12. The system of claim 9 wherein:

computer program instructions for executing a plurality of transaction operations on the database structure by a plurality of respective invocations of a database management system of the database structure by the respective plurality of application units comprise:

computer program instructions for preparing the execution of a set of transaction operations based on a common definition; and computer program instructions for executing each transaction operation of the set of transaction operations according to the corresponding preparation;

computer program instructions for determining the locks being applied by the database management system for each transaction operation executed by each application unit further comprise:

computer program instructions for, in response to intercepting each corresponding invocation of the database management system by each application unit, querying the database management system to retrieve the locks being applied by the database management system for each transaction operation and logging an indication of the locks for the set of transaction operations; and computer program instructions for, in response to the interception of an invocation of the database management system for the execution of the transaction operation, retrieving the locks being logged for the set and saving a log item including an indication of the application unit and of the locks for the set.

13. The system of claim 8 wherein the deadlock conditions are mixed type deadlocks, the mixed type deadlocks caused by a combination of one or more transaction operations and one or more application operations.

14. A test system for testing a transactional software application interacting with a database structure, the transactional software application including a plurality of application units adapted to be executed at least in part concurrently, wherein the test system comprises:
- a processor;
- an automation tool for executing the software application, the execution of the software application including executing a plurality of transaction operations on the database structure by threads invoking a database management system of the database structure;
- a stub module for a driver of the database management system for determining locks being applied by the database management system on elements of the database structure for each transaction operation executed by each thread;
- an analyzer for identifying each potential deadlock condition of the software application in each possible succession of application of the locks according to each possible interleaving of the threads, identifying the potential deadlock conditions facilitated by analyzing a lock tree of the software application, the analyzer configured for:
    - constructing one or more formal expressions; and
    - finding an assignment of one or more variables of the one or more formal expressions to determine the successions of application of the locks causing the deadlock conditions; and
- a theorem prover configured to provide a variable assignment that determines whether the one or more formal expressions leading to the deadlock conditions are true or false.

* * * * *